US012255790B2

(12) United States Patent
Stavisski et al.

(10) Patent No.: US 12,255,790 B2
(45) Date of Patent: *Mar. 18, 2025

(54) CLOUD-BASED APPLICATION PERFORMANCE MANAGEMENT AND AUTOMATION

(71) Applicant: IT-CONDUCTOR, INC., Cupertino, CA (US)

(72) Inventors: David Stavisski, Aliso Viejo, CA (US); Linh Nguyen, Cupertino, CA (US)

(73) Assignee: IT-Conductor, Inc., Cupertino, CA (US)

( * ) Notice: Subject to any disclaimer, the term of this patent is extended or adjusted under 35 U.S.C. 154(b) by 0 days.
This patent is subject to a terminal disclaimer.

(21) Appl. No.: 18/412,187

(22) Filed: Jan. 12, 2024

(65) Prior Publication Data
US 2024/0154882 A1 May 9, 2024

Related U.S. Application Data

(63) Continuation of application No. 17/713,212, filed on Apr. 4, 2022, now Pat. No. 11,882,009, which is a (Continued)

(51) Int. Cl.
*H04L 12/66* (2006.01)
*H04L 9/40* (2022.01)
(Continued)

(52) U.S. Cl.
CPC .......... *H04L 41/5032* (2013.01); *H04L 12/66* (2013.01); *H04L 43/06* (2013.01); *H04L 63/0227* (2013.01)

(58) Field of Classification Search
CPC ..... H04L 41/5032; H04L 12/66; H04L 43/06; H04L 63/0227; H04L 67/10; H04L 67/50; (Continued)

(56) References Cited

U.S. PATENT DOCUMENTS 9,612,815 B1* 4/2017 Jagtap .................... G06F 8/61
2014/0006614 A1* 1/2014 Bali .................... H04L 67/1008
709/224
(Continued)

FOREIGN PATENT DOCUMENTS

JP 4607486 B2 1/2011

OTHER PUBLICATIONS

Extended European Search Report for EP App No. 20858504.2 dated Jul. 26, 2023, 7 pgs.
(Continued)

*Primary Examiner* — Aftab N. Khan
(74) *Attorney, Agent, or Firm* — Procopio, Cory, Hargreaves & Savitch LLP

(57) ABSTRACT

A system for managing system performance of one or more customer systems, the system comprising: a memory for storing one or more objects; a gateway communicatively coupled to a customer system, the customer system separated from a wide area network by a firewall, and including one or more computer systems and databases within a customer premises; one or more processors communicatively coupled to the memory and the gateway, the firewall being disposed between the gateway and the one or more processors, the one or more processors and the gateway configured to receive data related to speed, performance of the customer system over a first period of time, receive data related to speed and performance of the customer system over a second period of time, and provide one or more displays related to comparisons of speed and performance over the first and second periods of time based on a user input.

8 Claims, 13 Drawing Sheets

Related U.S. Application Data continuation of application No. 17/006,736, filed on Aug. 28, 2020, now Pat. No. 11,329,899.

(60) Provisional application No. 62/892,922, filed on Aug. 28, 2019.

(51) Int. Cl.
*H04L 41/50* (2022.01)
*H04L 43/06* (2022.01)

(58) Field of Classification Search
CPC ... H04L 67/535; H04L 67/75; H04L 41/5012; H04L 41/22; H04L 43/045
See application file for complete search history.

(56) References Cited

U.S. PATENT DOCUMENTS

| | | | |
|---|---|---|---|
| 2015/0227406 A1 | 8/2015 | Jan et al. | |
| 2017/0302553 A1* | 10/2017 | Zafer | H04L 43/08 |
| 2017/0344193 A1 | 11/2017 | Gasperi et al. | |
| 2018/0270126 A1* | 9/2018 | Tapia | H04L 43/065 |
| 2019/0102719 A1 | 4/2019 | Singh et al. | |
| 2019/0312789 A1 | 10/2019 | Asbi et al. | |
| 2020/0274782 A1* | 8/2020 | Balaiah | H04L 67/10 |
| 2020/0371901 A1* | 11/2020 | Sastry | G06F 11/3692 |

OTHER PUBLICATIONS

International Search Report and the Written Opinion for PCT/US2020/048639, dated Dec. 11, 2020 (11 pages).

* cited by examiner

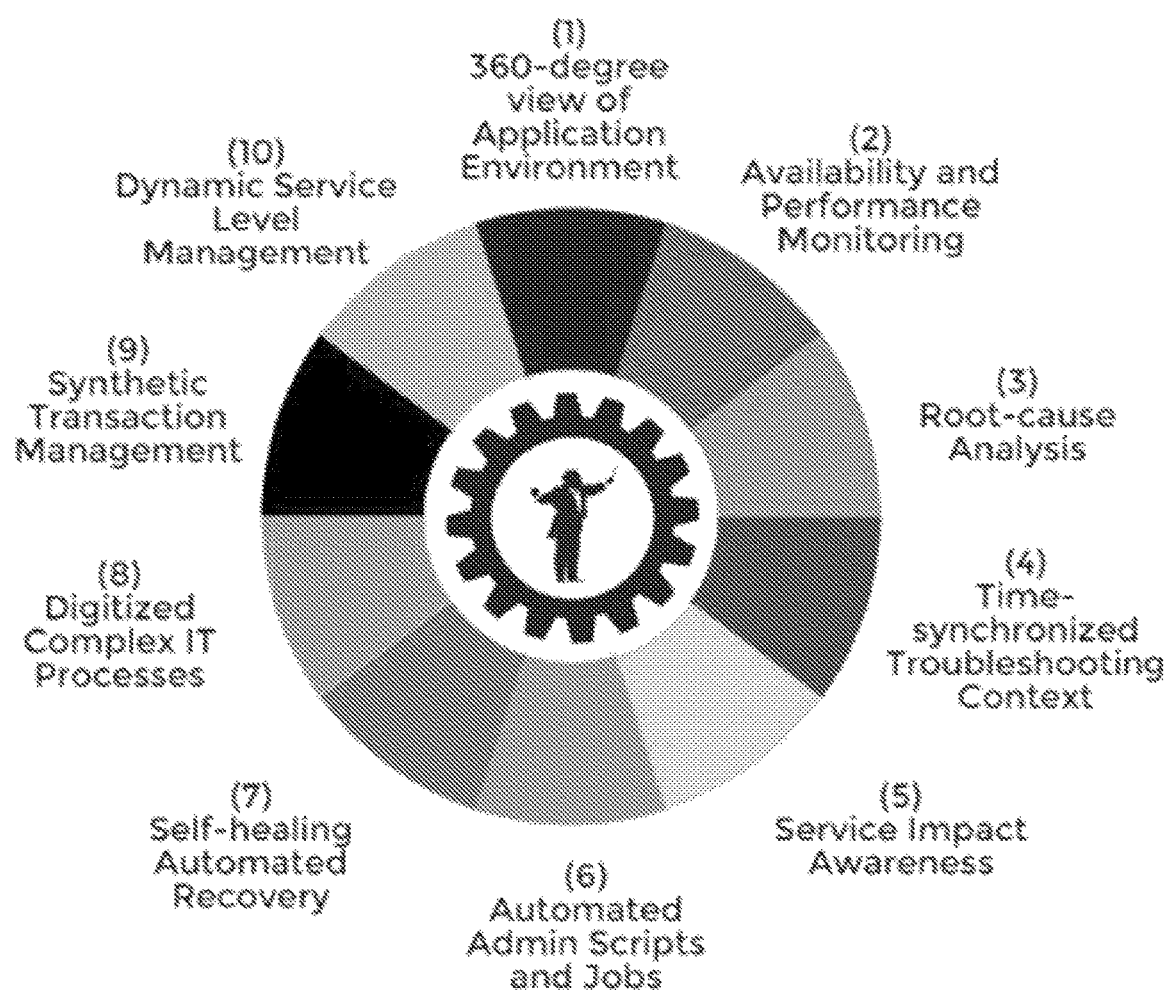
Figure 1: 10-ways to Automate towards Smart Application Management

CLOUD-BASED APPLICATION PERFORMANCE MANAGEMENT AND AUTOMATION

CROSS-REFERENCE TO RELATED APPLICATIONS

This application is a continuation of U.S. patent application Ser. No. 17/713,212, filed Apr. 4, 2022, which is a continuation of U.S. patent application Ser. No. 17/006,736, filed on Aug. 28, 2020, which claims priority to U.S. Provisional Patent Application Ser. No. 62/892,922, filed Aug. 28, 2019, and entitled "Cloud-Based Application Performance Management and Automation," all of which are incorporated herein by reference in their entirety.

BACKGROUND

1. Technical Field

The embodiments described herein are related to systems and method for automating complex enterprise tasks. Some such tasks can include, for example the orchestration of such activities as shutdown and startup of multi-tier applications, consisting of several technology components by arranging the proper sequence based on application dependencies. More specifically, the system and method can deliver comprehensive Application Management and Information Technology (IT) Process automation as a service.

2. Background

Investment in IT infrastructure without the inclusion of monitoring is incomplete, like running systems and databases without data protection and backup. Global businesses realize the importance of protecting their investment in mission-critical applications and infrastructure through the monitoring and maintenance of complex IT system landscapes.

The rapidly evolving computing landscape has led to a surge in infrastructure as a service (IaaS) using private and public cloud. For many companies, the need to modernize their core computing platform is key to enabling the next wave of business innovations, done at agile speed to stay competitive. These new digital infrastructure initiatives often necessitate application upgrades, migrations and new implementations, which in turn also require new management tools appropriate for an agile cloud-based environment. Business investments in IT come with expectations for IT to deliver high-quality services. Application Performance Management (APM) are tools and processes that allow the automation of monitoring and related service management, to provide effective and continuous insight into application health. Minimizing the noise will, in turn, maximize the performance of these applications.

An effective APM platform needs to relate the many business processes, software and infrastructure layers, continuously process large volume and velocity of metric and event data. Then efficiently use the resulting information to support critical management of application availability and performance, with the ultimate goal of minimizing disruptions to business operations.

The lengthy and cumbersome process of setting up monitoring applications is excessively time-consuming and detrimental to business operations, thus there is a need for APM solutions with sophistication and less complication. Application monitoring through the use of silos of tools creates a lack of integration and cohesion among the functional areas of a business, as well as deducting from the value derivable from consolidated data.

The complexity of setting up, configuring and customizing of new monitored business systems using the applications in the market today diminishes your ROI due to added cost in time, effort and resources. Such challenges pose a significant threat to business operations and the reliability of the digital infrastructure platform. Moreover, operating in a reactive mode is often a result of an ineffective monitoring solution which will invariably keep the IT team a step behind fatal system events.

SUMMARY

One aspect of the disclosure provides a system for evaluating and managing system performance of one or more customer systems. The system can have a memory for storing one or more objects. The system can have a gateway communicatively coupled to a customer system. The customer system separated from a wide area network by a firewall. The customer system can have one or more computer systems and databases within a customer premises. The system can have one or more processors communicatively coupled to the memory and the gateway, the firewall being disposed between the gateway and the one or more processors. The one or more processors and the gateway can receive data related to speed and performance of the customer system over a first period of time. The one or more processors and the gateway can receive data related to speed and performance of the customer system over a second period of time. The one or more processors and the gateway can provide one or more displays related to comparisons of speed and performance over the first and second periods of time based on a user input.

Other features and advantages will be apparent to one of ordinary skill with a review of the following disclosure.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which:

FIG. 1 is a graphical depiction of various ways to automate toward smart application management;

DETAILED DESCRIPTION

The systems and methods described here disclose a viable APM solution implemented via a remote monitoring and application performance management platform 100. Platform 100 can be implemented as an APM-as-a-service that allows end-users anywhere in the world to benefit from both automatic monitoring templates to customized management requirements, delivered at cloud speed. The platform can allow elimination of the need for on-premise hardware such that end-users will not need to acquire and manage their own hardware (HW)/software (SW) infrastructure for monitoring and automation of IT Applications. In addition, the system can eliminate the need to manually perform the associated routine IT processes and maintenance.

The disclosed platform 100 and system can provide a browser-based interface and notifications via e-mail or text messaging as well as integration with customer's Service Desk/Help Desk systems. Platform 100 remotely orchestrates complex IT operations, saving end-users up to 90% of the time and cost, while gaining a valuable global Remote Trusted Advisor. Platform 100 delivers low-overhead, non-invasive solutions that increase visibility into system performance, improve data gathering, and provide targeted analysis and troubleshooting for SAP systems so that the IT team can become more proactive and responsive which will enable them to have a direct, positive impact on business operations.

Platform 100 allows a user to run reports automatically on a pre-defined schedule and email them to key team members as well as IT management.

Platform 100 offers granular level monitoring of the applications in your landscape enabling the end-user to implement highly sophisticated Performance and Service Level Management, complete with true policy-driven automation/remediation, reporting, and integration with the rest of your operational landscape. Platform 100 allows for highly sophisticated interactive charting, drill downs, and contextual presentation while providing high scalability with the use of modest resources, and provides an easy-to-use, web-based interface for mining and reporting on the historical SAP performance and availability data.

Management as a Service

FIG. 1 is a graphical depiction of various ways to automate toward smart APM. As can be seen, the graph of FIG. 1 illustrates 10 ways: 1. Providing a 360-degree view of the application environments; 2. providing availability and performance monitoring; 3. providing root-cause analysis; 4. providing time-synchronized troubleshooting context; 5. providing service impact awareness; 6. providing automated administrative scripts and jobs; 7. providing self-healing automated recovery; 8. providing digitized complex IT processes; 9. providing synthetic transaction management; and 10. providing dynamic service level management. As explained below, platform 100 can provide many of not all of these functions.

Figure 2A:
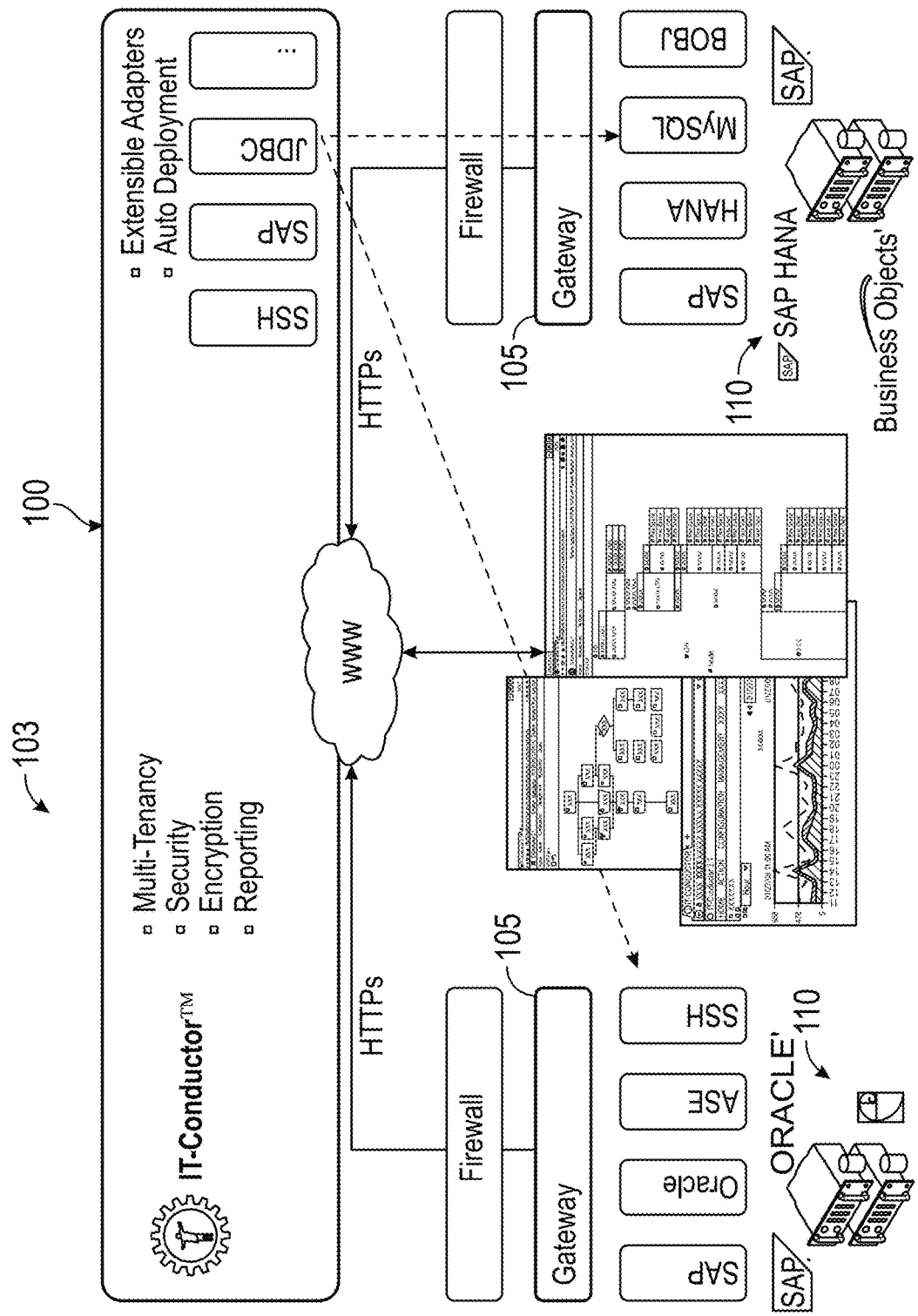
FIG. 2A is a graphical depiction of a system for automatic application performance management.

FIG. 2A is a graphical depiction of a system 103 for automatic APM that is built around platform 100. Platform 100 can be implemented to monitor one or more customer system 110 (two customer systems 110 are shown in FIG. 2A). The customer system 110 can be a complete computer ecosystem. Platform 100 can seamlessly manage the whole SAP technology stack—from Front-End Services down to Cloud/Virtualization infrastructure: SAP NW (ABAP & Java), BusinessObjects, Hadoop, DBMS (HANA, Oracle, ASE, MaxDB, DB2), SAP Host Agent, Linux, VMWare, Azure, AWS. Platform 100 can further provide in-depth APM for major SAP Ecosystem Components.

Platform 100 can be implemented as a cloud-based service without the need to install any monitoring infrastructure within customer systems 110, except for a locally installed gateway 105. APM can then be delivered by platform 100 as a full-service model—including monitoring configuration and performance analysis. The hosted service offering minimizes deployment and ongoing maintenance, allowing full spectrum availability and performance management in a matter of hours even for very large and complex environments. The deployment of a small gateway 105 (proxy-agent) securely within the customer network, combined with best-practice application templates, enables automated and effective application monitoring and management much more efficient.

The gateway 105, application and protocol-specific adapters, and the cloud web services APIs are some of the elements of platform 100 that allow data to be transferred from the monitored systems, e.g., the customer systems 110 through the gateway 105. Each customer (tenant) can have multiple gateways 105, depending on the embodiment, e.g., for scalability, multi-location setup such as on-premise and public cloud, network segmentation such as production and non-production, and resilience. Primary and failover configuration can be handled automatically by platform 100.

Figure 2B:
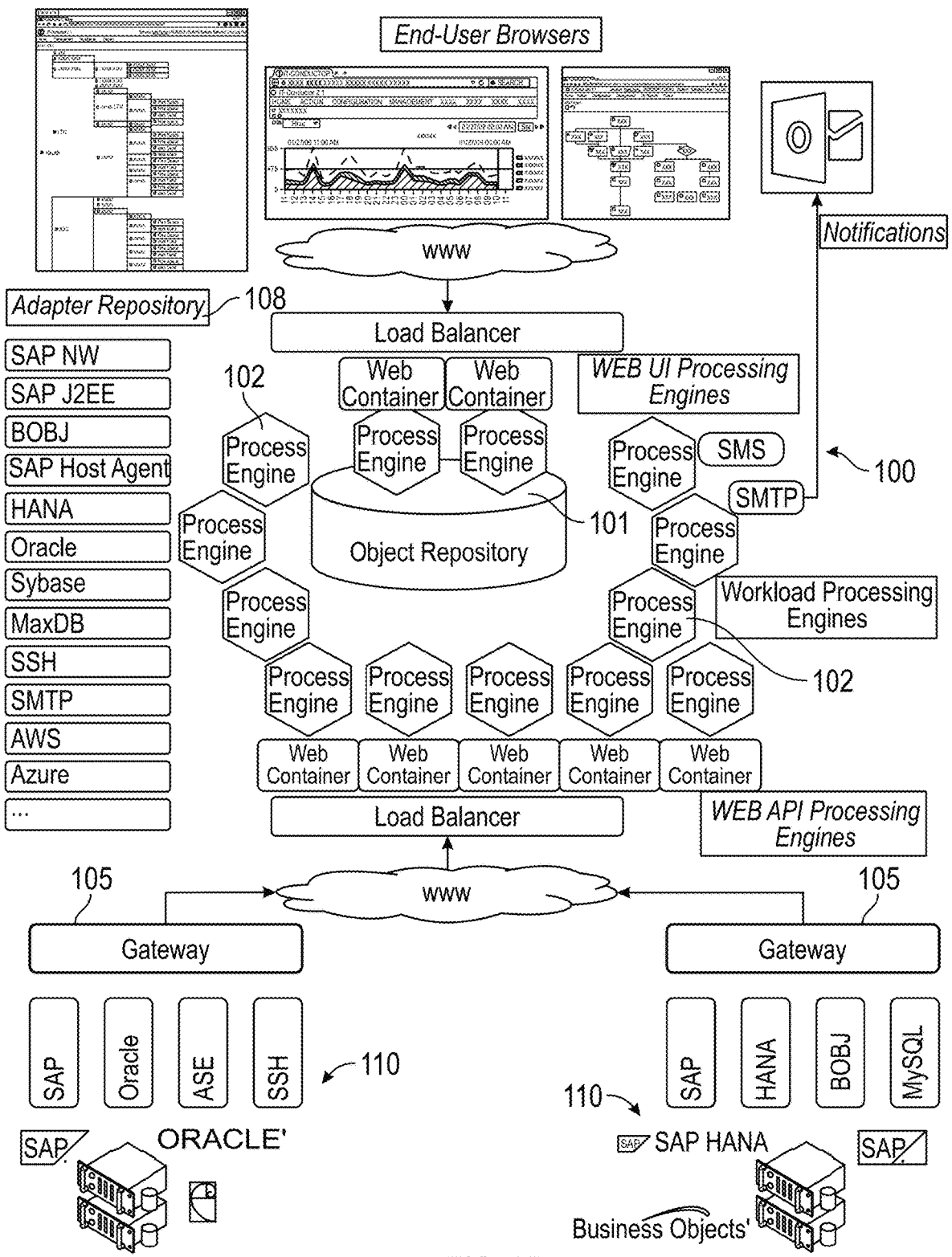
FIG. 2B is a graphical depiction of another embodiment of the system of FIG. 1.

FIG. 2B is a graphical depiction of another embodiment of the system 103 of FIG. 2A that illustrated platform 100 in more detail. As can be seen, platform 100 can have an object repository 101. Platform 100 can store objects in the repository 101 based on relational DBMS. The object repository 101 can be an object-oriented storage (e.g., a memory) that includes the metadata (such as object class definitions) and instance data representing object instance. All data can be expressed through objects of different classes, which includes Systems & Applications, their components, Metric and Log records, etc. Each object instance boils down to a collection of attribute values. The object repository 101 can include one or more memories (e.g., a database) that stores objects. In this sense, an object can refer to a particular instance of a class, where the object can be a combination of variables, functions, and data structures. Object repository 101 can provide Object-oriented persistence layer based on relational SQL DB. The repository 101 can be the main enabler of flexibility within platform 100 that makes it possible to express complex architectures typical of modern enterprise applications.

Processing Engines 102 can also be included in platform 100. Processing engine(s) 102 may also be referred to herein as engine 102. Only two of the engines 102 are labeled in FIG. 2B. The engines 102 implement an object space with caching and massively multi-threaded processing. Engines 102 communicate with each-other directly via UDP based messaging and indirectly through the DB. Engines 102 load active objects in memory and perform scheduling, which accounts to managing the queues for the objects to temporary acquire java threads and execute the request sent to them.

The active objects implement a wide variety of workloads, which include data-processing such as background aggregation, individual threshold monitoring, event and job scheduling, reporting, notification and running web containers.

Engines 102 are organized into groups, with some executing background workloads and others running web-containers that handle all external access—Web GUI and Web Services APIs.

The external interfaces are implemented by objects that implement web containers (Jetty) and that are scheduled to run constantly, usually on dedicated EC2 VMs. Both UI and API Web Containers can be implemented using Jetty, but they provide different services—HTML GUI and SOAP/REST APIs respectively (both can be Servlet based).

As noted, platform 100 can also comprise one or more gateways 105. A gateway 105 is the only component (e.g., software, hardware, firmware) that is installed at a customer premises. This can be a dedicate machine that has access to the internet (e.g., cloud services) and to the local systems to be managed. Gateway 105 downloads appropriate adapters from platform 100 in the cloud and uses them to interact (agentlessly) with specific systems under management. No agents or other software installations are required for the managed systems. Gateways 105 communicate with platform 100 cloud services using Web Services APIs. A customer can have multiple gateways 105 for scalability, multi-location setups and resilience (failover), etc.

Platform 100 can have a plurality of adapters 108. Adapters 108 can include java libraries that allow gateways 105 to interact with managed systems and applications. A purpose of the adapter 108 is to translate commands/data between specific system/application type and standard platform 100 notations.

Infrastructure

Platform 100 cloud services can be implemented on Amazon Web Services (AWS) infrastructure:
- All compute (EC2 Instances) is distributed across several Availability Zones for maximum resilience;
- DBMS is AWS RDS Aurora cluster that also delivers high availability and resilience; E-mail and Text message Notifications are performed using AWS SNS (Simple Notification Services);
- DNS Load balancing is utilizing AWS Route53 service; and
- Although fully leveraging AWS infrastructure, no proprietary AWS interfaces or APIs are used avoiding AWS lock-in Implementation Languages and Libraries All platform 100 services can be implemented in Java with the exception of the Web UI that includes in-browser JavaScript. In most implementations, platform 100 does not use any third-party or open source frameworks, all core code is proprietary.

Availability Monitoring

Figure 3:
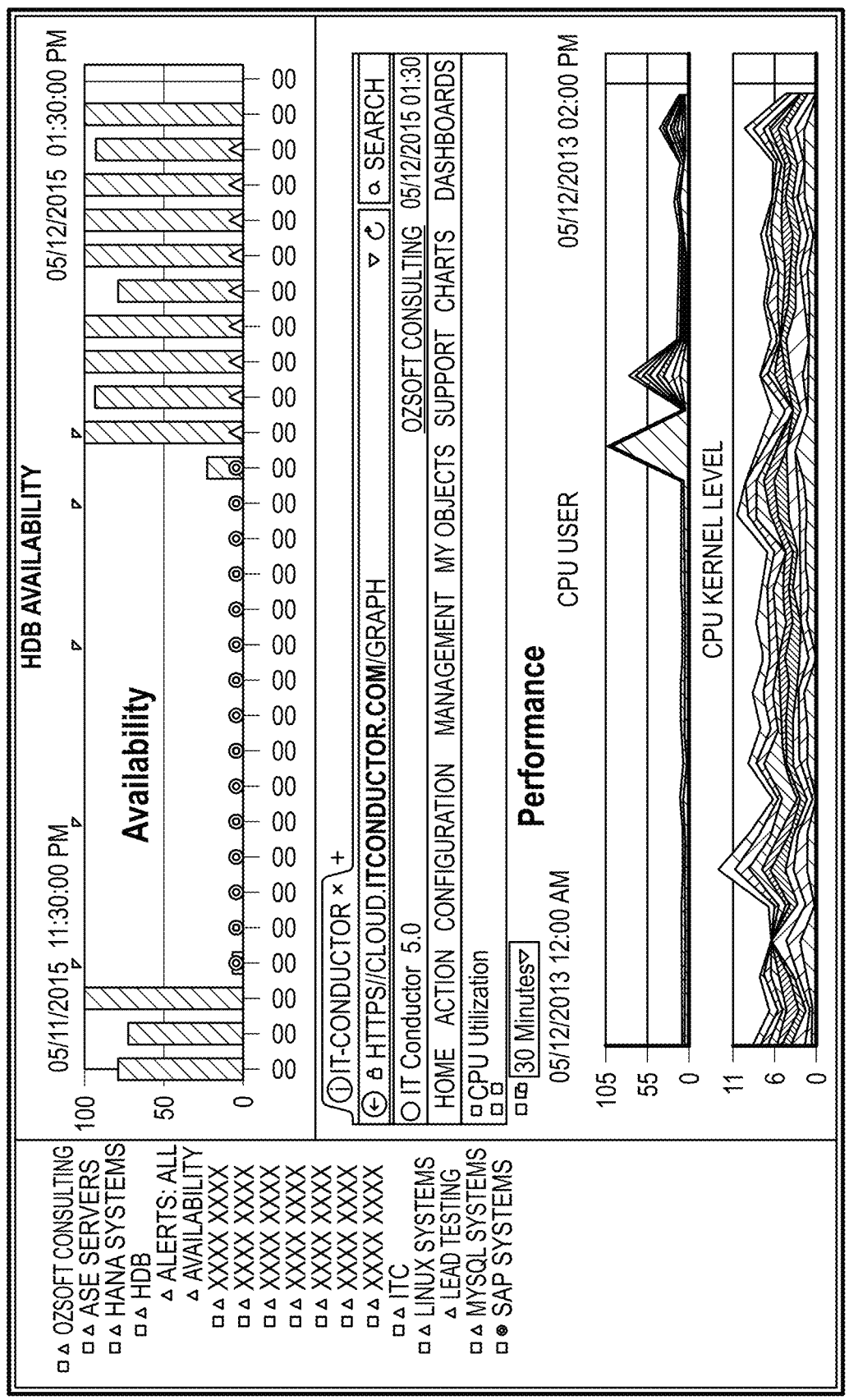
FIG. 3 is a table showing availability of a system versus system utilization versus time.
Figure 4:
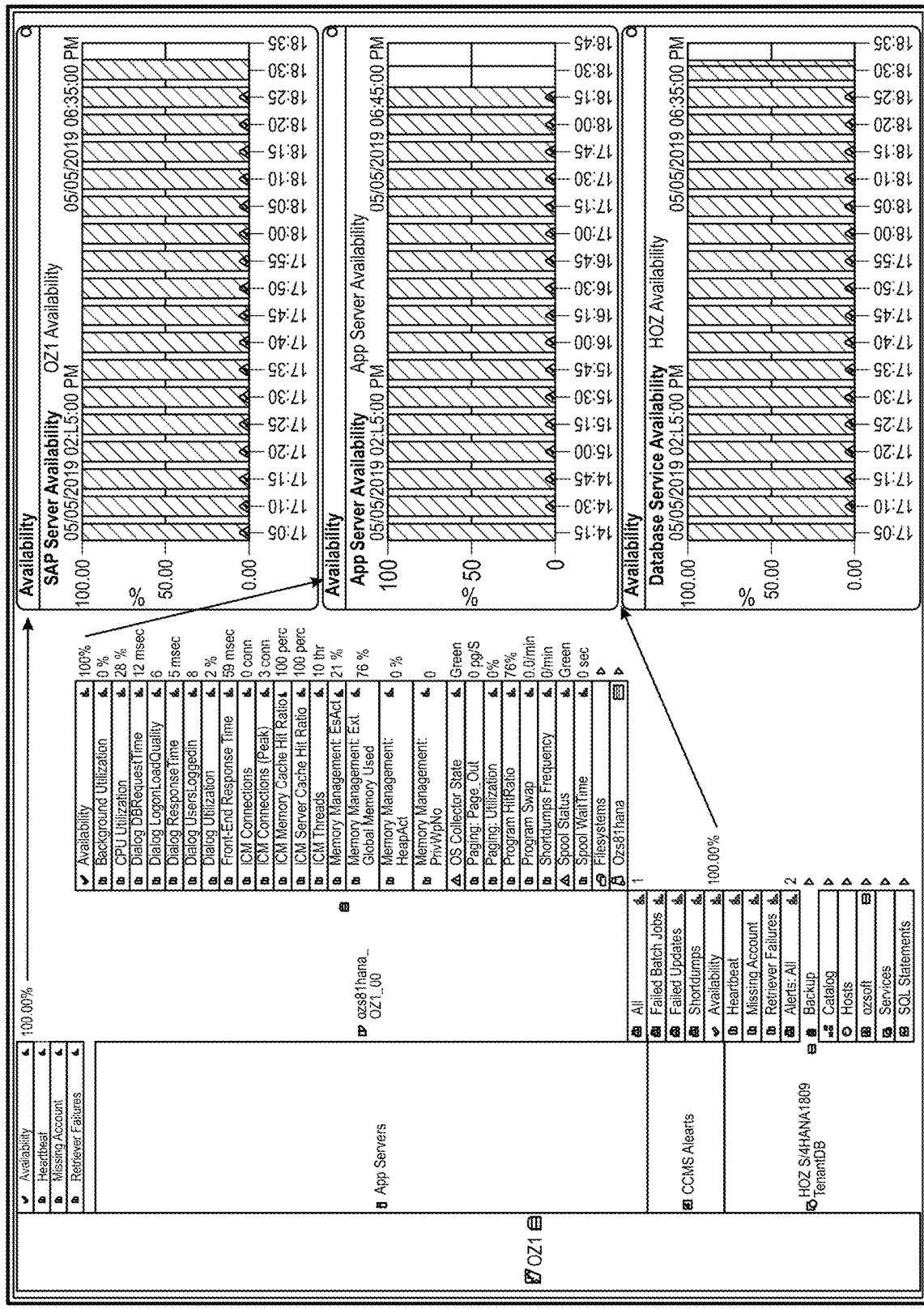
FIG. 4 is a plot of multi-component availability.

FIG. 3 is a table showing availability of a system versus system utilization versus time. The two plots shown in FIG. 3 depict an exemplary availability and performance of an exemplary computer system. FIG. 4 is a plot of multi-component availability.

Reference is made to FIG. 3 and FIG. 4 in the following description. Platform 100 can output versions of the plots of FIG. 3 and FIG. 4 according to operations and performance of the customer system 110. In general, availability of a computer system can be a critical and fundamental requirement for monitoring, yet availability information alone is not useful without a service context as well as relationship to service level objectives (SLO). SLO defines what availability should be (what percentage over time) and how it should be measured (sampling interval and calculation window). Availability of services can be very different from component availability.

For example, an SAP application such as ERP may have uninterrupted availability for end users, yet one or more of its system components such as application servers, message server, enqueue server, and database servers can be down at any given time. If the architecture is deployed with the appropriate high-availability (HA) configuration, then the service may be 100% available while the redundant components can be less than 100%. With proper service monitoring, these can be properly distinguished and managed accordingly.

Platform 100 can monitor the availability of user-defined Services as well as supporting infrastructure components, which make up the service with a flexible configuration.

Performance Intelligence

The ability to monitor and analyze what happened yesterday, last week or last month about the same time frame/reference is one challenge deserving attention. This requires synchronized data series. Platform 100 monitors the Performance of services, applications, and IT infrastructure via pre-defined and/or a custom set of KPIs, in time dimensions, which allow not only active service level management, but also back-in-time troubleshooting with correlation, comparisons, and historical snapshots. These features are shown in FIG. 4, indicating historical availability statistics.

Figure 5:
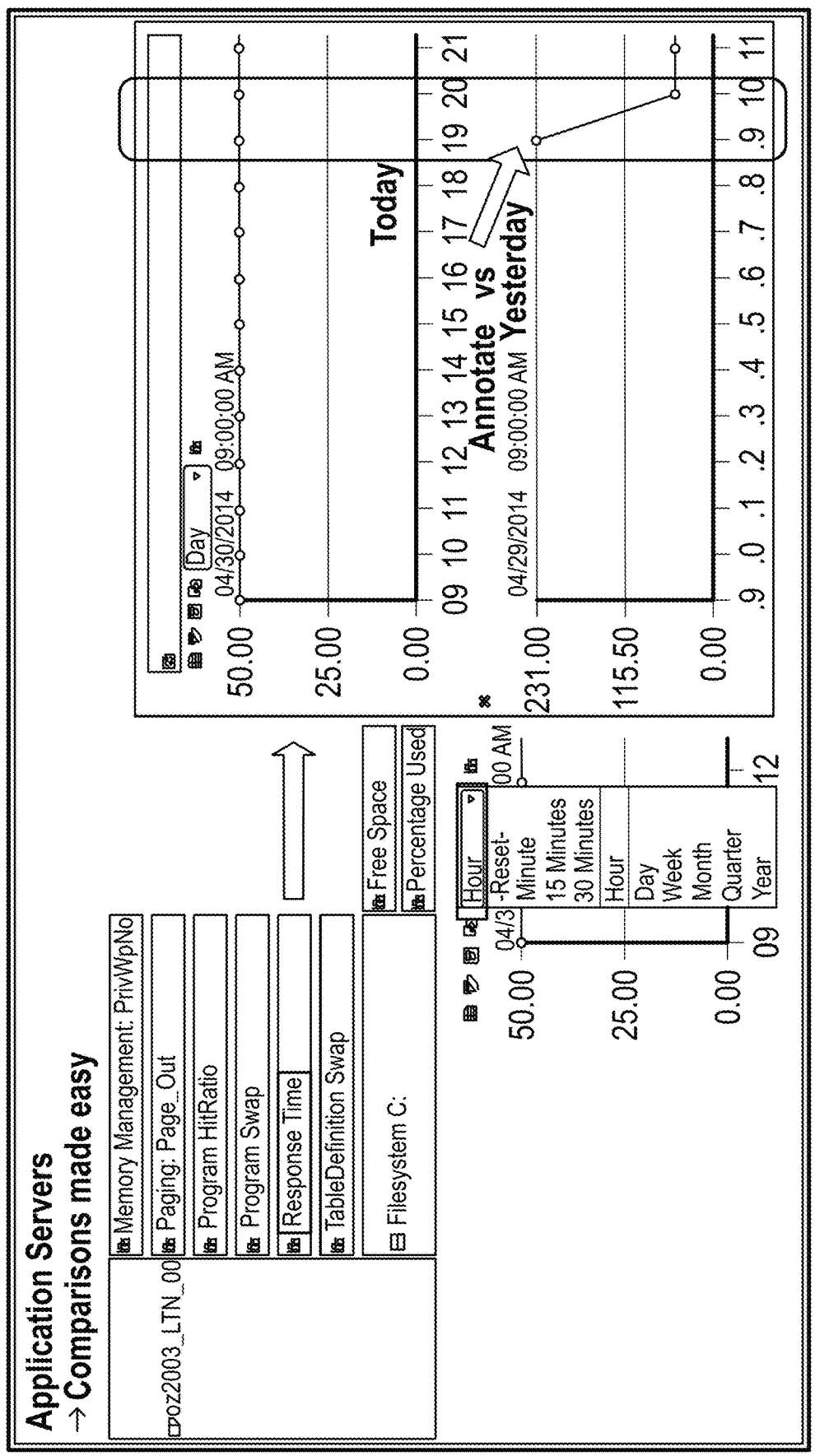
FIG. 5 is a plot of a comparison of metrics and timeframes.

FIG. 5 is a plot of a comparison of metrics and timeframes. As shown paltform 100 can provide comparisons of various metrics and performance indicators (e.g., response time, as shown) on a day over day or even hour over hour basis.

Figure 6:
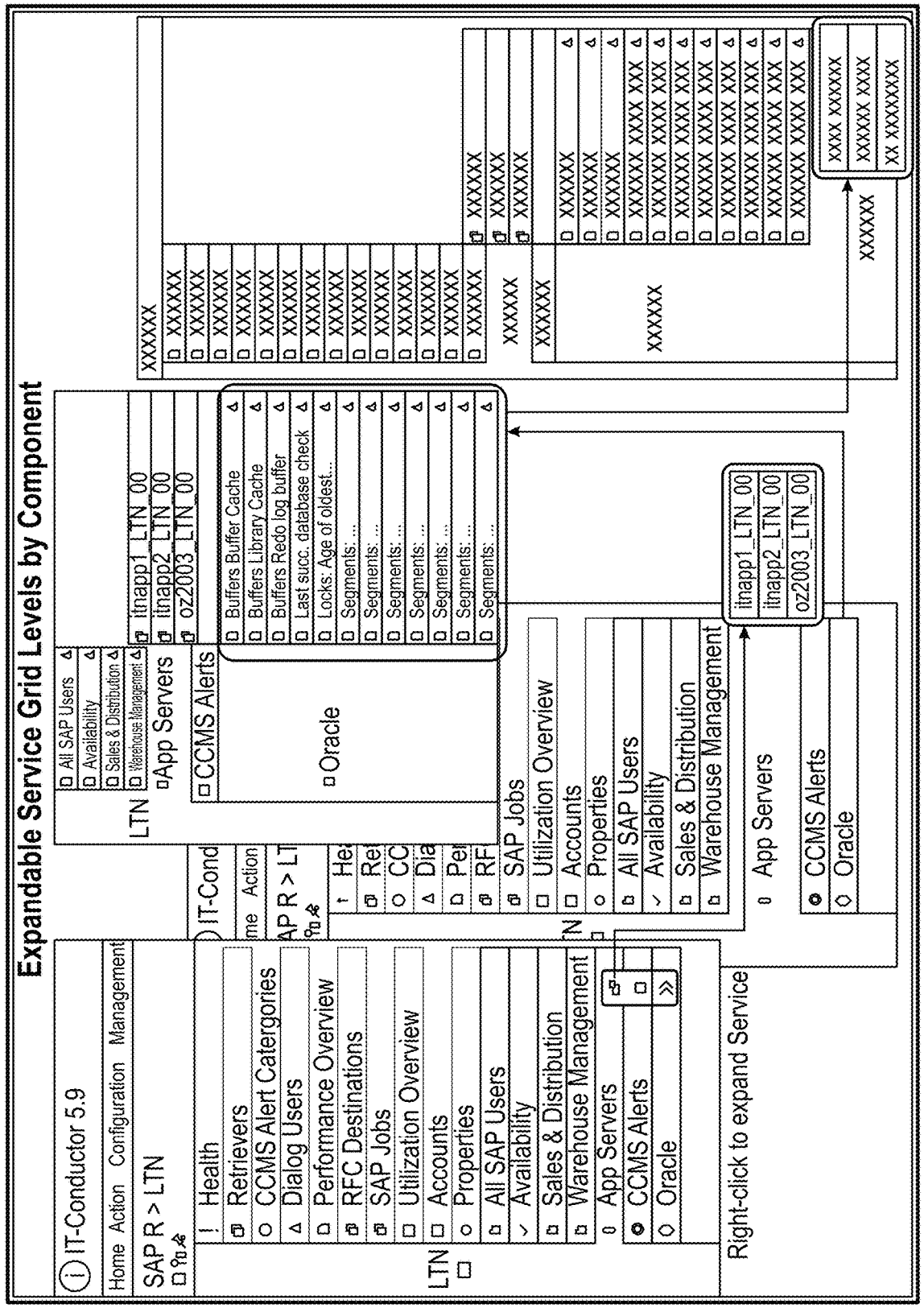
FIG. 6 is a graphical depiction of an exemplary service grid level report provided by ITC.

FIG. 6 is a graphical depiction of an exemplary service grid level report provided by platform 100. Some service level reports can be static and after-the-fact which are of little use for troubleshooting and proactive management. Platform 100 improves this functionality by offering a highly flexible service definition (e.g., FIG. 6) with dependencies such as servers and resource utilization which affect a service. ITC enhances service performance management in the following areas:
- End-user experience services can track specific sets of key performance indicators for a custom set of metrics, such as user, transactions, locations, dialog vs HTTP, etc.
- Service discovery of application-aware components and relationships
- Composite services assembled from other services and monitors
- Easily configure target availability, response times, and notification if the goals are not met
- Drill down into services to discover the root-cause of failures Multi-Dimensional Workload and Transaction Analysis Platform 100 has the ability to view performance in an intelligent manner, cross-referencing and changing analytical dimension on whatever views may be of interest to the performance analyst or within the context of time synchronized service data to allow point-in-time and trend analysis across many technical components and application instruments.

The example below shows the relationship between the service and its KPI "service response time", which comprises of one or more transaction response times. The transaction response times themselves can be further analyzed with components such as DB response times, network time, CPU time, etc. The focus can switch from service performance down to individual sub-components then sort and compare, all within a few clicks.

Figure 7:
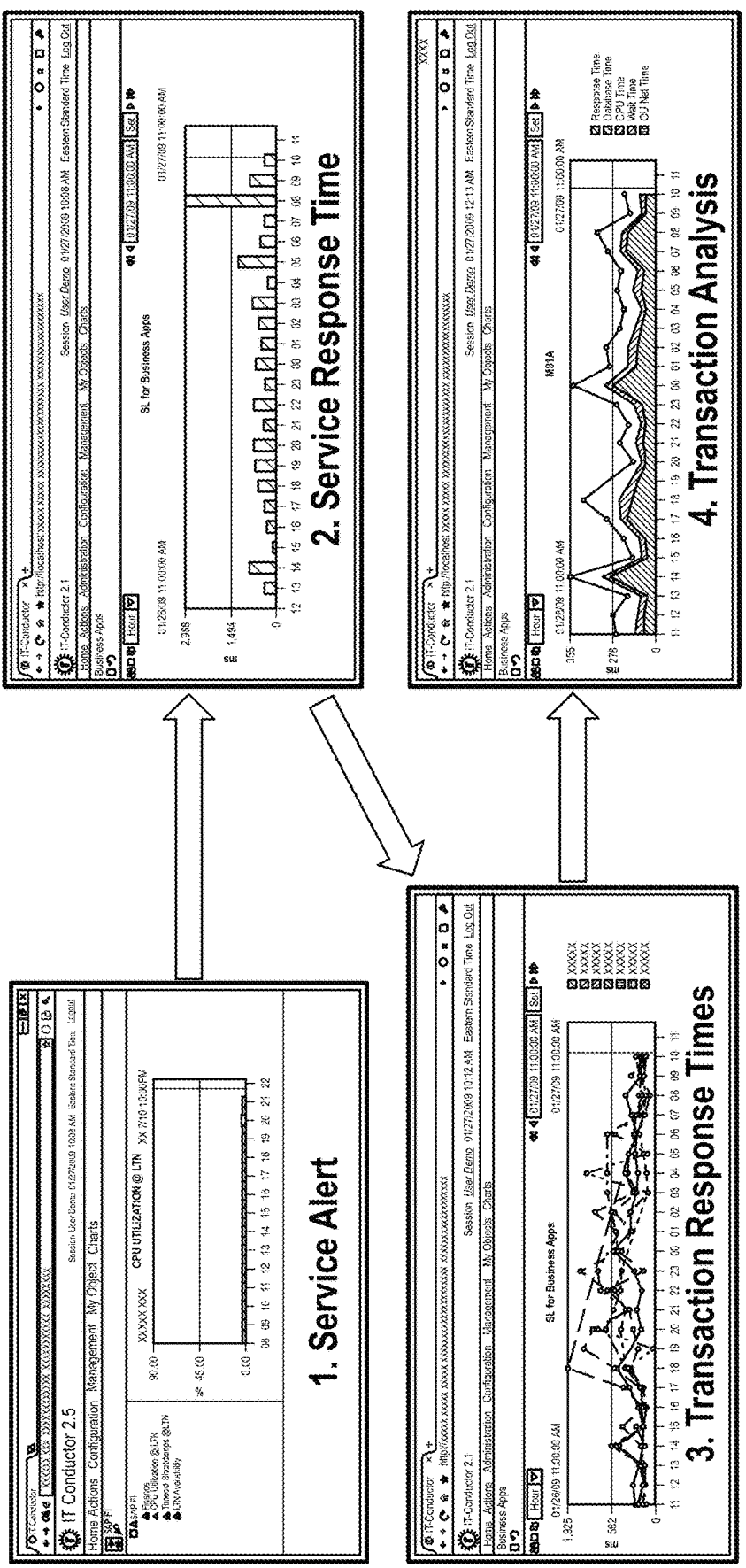
FIG. 7 is a graphical depiction of a analyzing services alerts.

FIG. 7 is a graphical depiction of analyzing services alerts. The process shown in FIG. 7 is representative of platform 100 capabilities in collecting and analyzing service alert response times, aggregating the associated data and providing analytics for the user. This approach combines the availability monitoring of applications and infrastructure components, together with performance KPIs, events from source system alerts and threshold exceptions. For example, service disruptions trigger alerts, notifications and lead directly to the point of time when the availability was detected. This allows further drill down to locate potential root-causes. Platform 100 also uses advanced troubleshooting context which automatically time synchronizes various service health components in order to assist in the root-cause determination. Platform 100 also uses templates to simplify the correlation between complex application components and how they relate as well as impact overall performance and availability. This proves effective at reducing analysis time and which in turn enhances the overall IT service quality.

Dynamic Service Level Management

Platform 100 can also offer integrated SLM on top of application and system monitoring:
  Dashboards support operational service level monitoring and compliance.
  Service Level Agreement & Operational Level Agreement proactively managed for compliance
  Automated and flexible report generation and delivery
  Service desk integration with notifications to ITSM platforms which support webservices API, and charts built in to email notifications which can be further drilled down.

Figure 8:
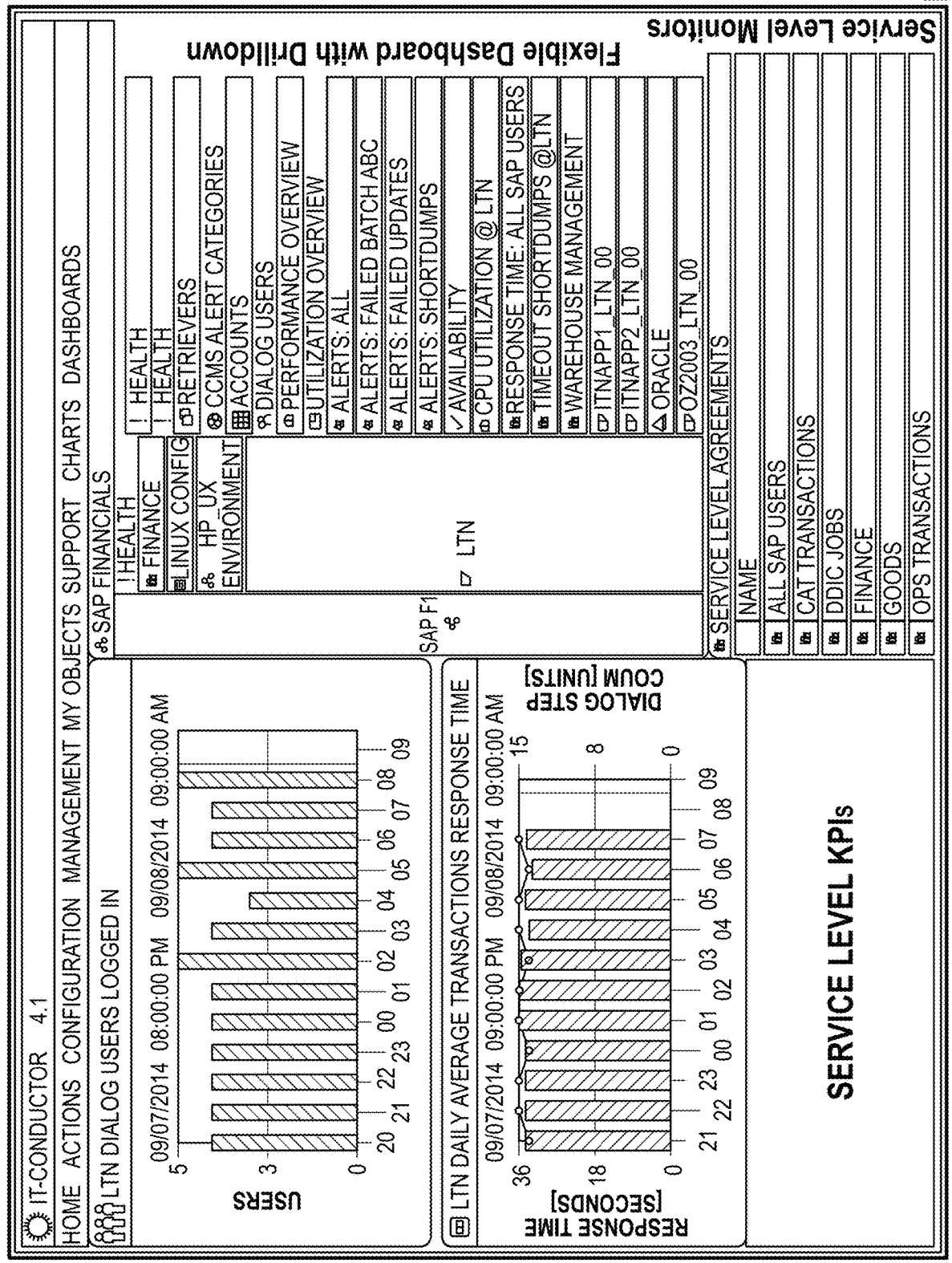
FIG. 8 is a graphical depiction of a user interface providing intuitive drilldowns on service level KPIs for analyzing system performance.

FIG. 8 is a graphical depiction of a user interface providing intuitive drilldowns on service level KPIs for analyzing system performance.

Figure 9:
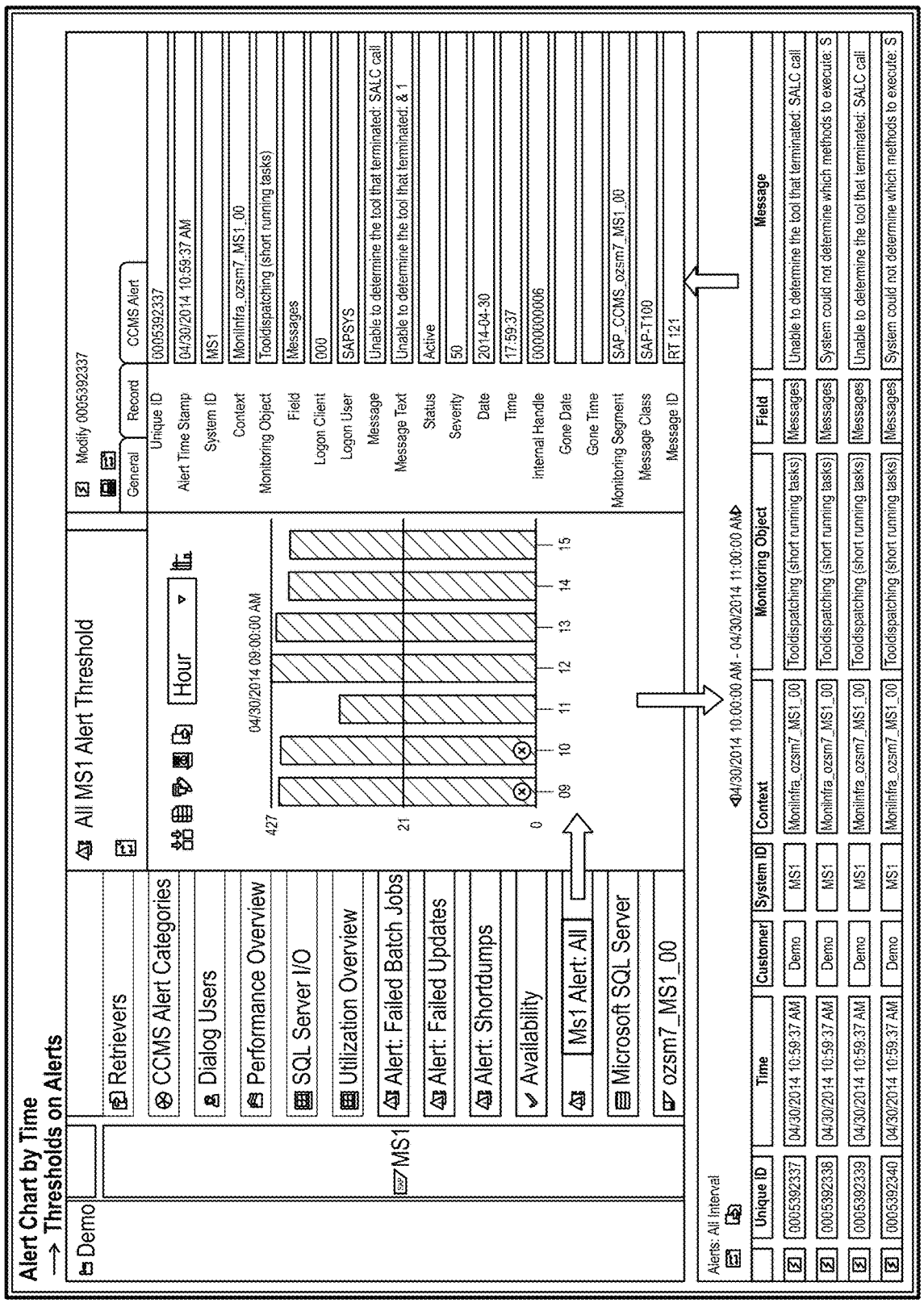
FIG. 9 is a graphical representation of a user alert management.

FIG. 9 is a graphical representation of a user alert management.

Alerts Management

Most monitoring solutions treat alerts as raw events without much context or relationship. Platform 100 manages alerts more effectively by using policy-based exceptions where alerts can be filtered, time-synchronized and automatically recovered, including targeted notification to the right analyst reducing mean time to repair (MTTR).

Figure 10:
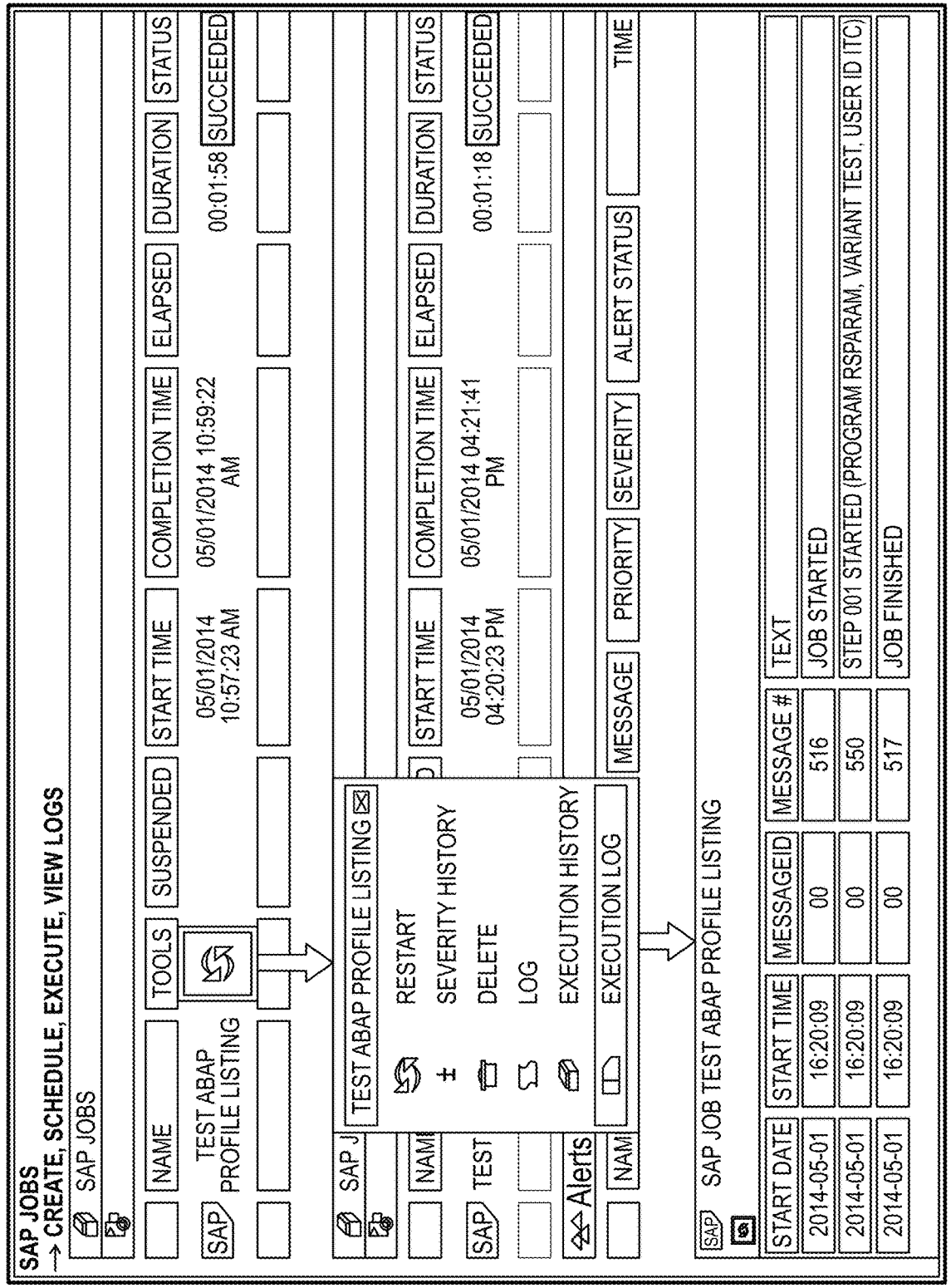
FIG. 10 is a graphical representation of a user interface for management of SAP job scheduling and monitoring.

FIG. 10 is a graphical representation of a user interface for management of SAP job scheduling and monitoring.

Process Automation

Monitoring alone often lacks proactiveness while automation solutions are often expensive, separate unintegrated products. Platform 100 utilizes a massively parallel processing engine to coordinate complex IT processes across open platforms and applications. SAP Job scheduling and monitoring is an example of this capability, which can extend to full IT Process Automation of Runbooks.

Self-Healing Automated Recovery

Platform 100 performs policy-based recovery/remediation actions. Platform 100 leverages automation, which can attempt recovery action upon an alert occurrence that a monitoring policy has been violated. An automated action is initiated to proactively prevent a service disruption as well as auto-closing the alert, if applicable with smart alert management rule. For example, an alert can auto-close if after a set time, the condition which originally raised the alert no longer exists and the status has returned to normal. Monitored thresholds can invoke auto-recovery actions using known fixes for common issues, or simply notify the person responsible to execute those actions.

The recovery action is highly customizable such as specific application commands. Database or shell script can be adapted to each customer and application's need.

Common usage scenarios include:
  DB archive log backup when the archive filesystem reaches set threshold
  Restarting printer queue when the monitored printer status goes offline
  Restart SAP qRFC queues when queues are stuck or errors occur The example below demonstrates how an Oracle filesystem is monitored and when it reaches a warning threshold of 95% full, triggers and alert as well a Recovery process to run a SAP brarchive log backup to save and delete offline archive files. Ultimately, space and recovery RTO/RPO are managed with frequent on-demand log backups.

Operation Processes

Figure 12:
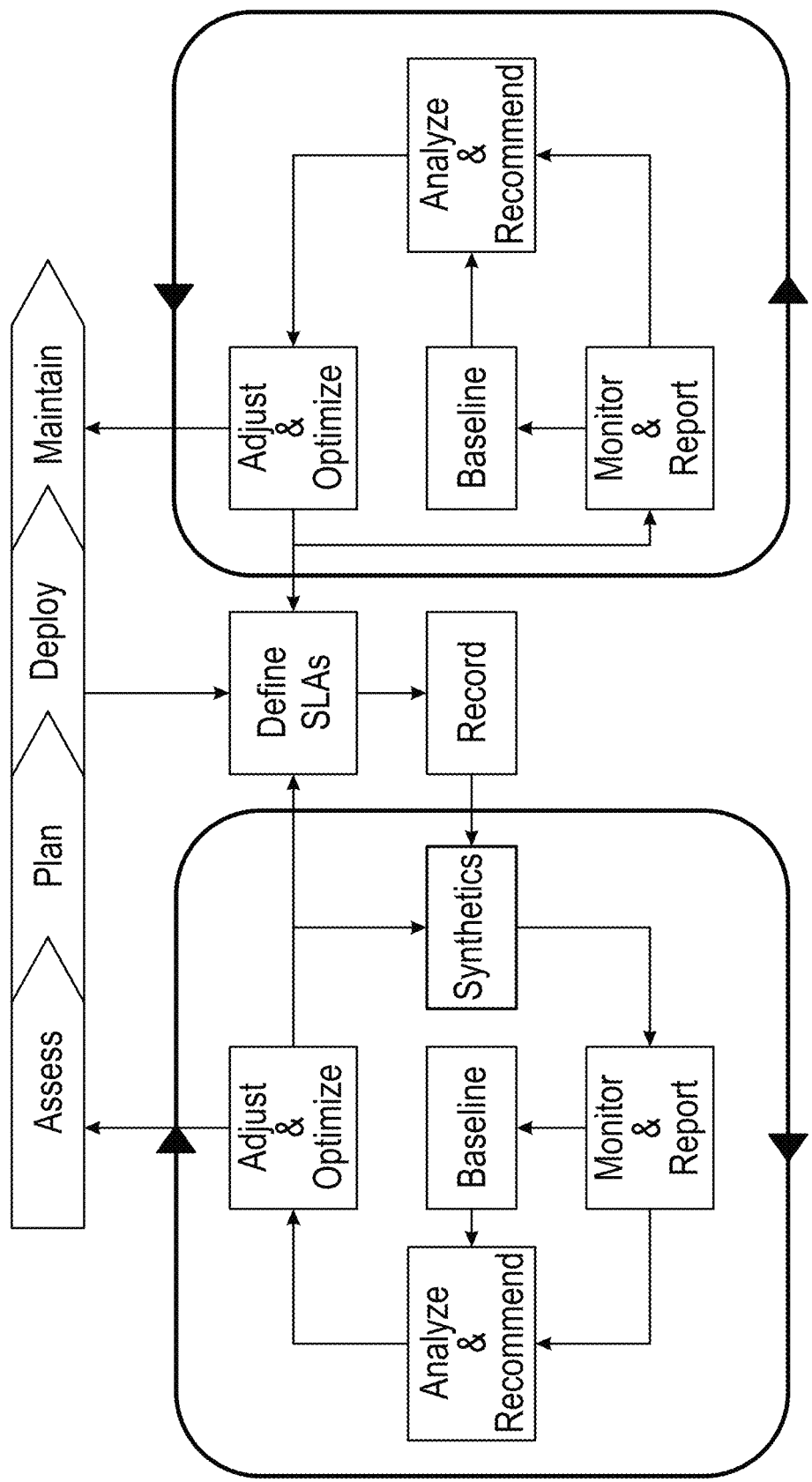
FIG. 12 is a platform which can improve the application availability and performance monitoring by integrating test transactions and reports in a coordinated manner across the application landscape.

Platform 100 incorporates a built-in scheduler and process composer that can orchestrate application native activities such as SAP jobs, database SQL and stored procedures, Linux/UNIX shell commands and scripts, as well webservices APIs, etc. platform 100 digitizes both simple and complex IT processes with these goals:
  Capture of core IT processes which should be recorded in runbooks for documentation or automation
  Complex environments are non-linear so workflows are best used to capture processes and dependencies
  Workflows should be repeatable, monitored and managed down to the individual task level Common usage scenarios include:
  Centralized scripts, replacing local schedulers like crontab
  Housekeeping jobs in SAP, databases and OS
  System refresh Post-copy Automation (PCA) when used in conjunction with platform 100 SID-Refresh™ Mass operations such as system startup and shutdown Synthetic Transaction Management Platform 100 can improve the application availability and performance monitoring by integrating test transactions and reports in a coordinated manner across the application landscape as illustrated in FIG. 12. Thus, platform 100 can:
  Test critical processes on a frequent basis to ensure the availability and performance service levels for them are constantly monitored
  When possible, simulate end-user experience from various points of entry to the service or application using robots or scripts that can be triggered centrally but executed remotely
  Baseline performance during different time periods got trend-analysis and exception-based alerting
  Transaction-level monitoring
  Integration with Performance Load Testing Reporting Platform 100 data can be reported in several ways (illustrated in table 1 as well):
  On-demand reports of charts, table, in multiple time intervals and period, which can be delivered as HTML or PDF
  CSV export of any metric or service hierarchy with flexible time intervals and period
  Scheduled reports based on XML definitions for the services or KPI Reports of pre-defined application such as HANA SQL or SAP mini-check, which can be delivered to a DBA's inbox.

the improvement and addition of useful business functions, the adoption of IT-Conduction is guaranteed to yield the desired business results and ROI. Included in standard SAP

TABLE 1

| Role | MONITOR Application Service Management | MANAGE IT Service Level Mananement | AUTOMATE IT Process Automation | OPTIMIZE Test & Performance Management | Reporting & Analytics |
|---|---|---|---|---|---|
| CIO | | IT to Business Service Mapping (BSM) | | | Compliance Reporting on IT KPI, Quality of Service |
| Business Service Manager | | Service-Centric Availability & Performance Management | | | Service Grid & Dashboards KPI reporting |
| IT Manager | Application-Centric Availability & Performance Management | Set coals (thresholds) for Operational & Service Level Agreement | Scheduled Report Delivery | Performance Baseline & Benchmark Capacity Planning Load-testing | Single Pane of Glass uniform management across Service Impact Analysis |
| Service Desk Analyst | Poilcy-based Notitcation | Proactive Service performance degradation/ outage notification Service impact visibility Support SLA/OLA Monitoring | | | Trend Analysis Support KPI Reporting |
| IT Operator | Hierarchical Subscription-based Notification | Hierarchical Subscription-based Notification | Automated Maintenance (backup etc) | Go-Live Validation | Incident Reporting |
| IT Administrator | 360 degrees view of Application Environment Root-Cause Analysis | Service Impact Awareness Root cause Analysis | Self-healing: Automated Recovery Manage Scripts, Batch Admin Jobs Digitize Complex IT Processes | Performance Monitoring Synthetic Transaction Performance Optimization | Time-synchronized Troubleshooting Content Logs Analysis |

Business Value

Platform 100 provides an integrated scalable cloud platform, there's features and benefits to meet the needs of many IT roles and teams:

Performance intelligence for the SAP ecosystem realized through power, speed, and ease of cloud access Improves IT support staff responsiveness and therefore end-user experience Flexible definition of scenarios, end-user monitoring, trend analysis, and dynamic reporting Hosted offer minimizes deployment and ongoing maintenance costs No long-term cost commitments Powerful but Simple to Use Most tools require extensive training to configure and utilize the tool, others require almost dedicated resource. But platform 100 is easy to learn and simple to use, yet powerful—thus allowing technical staff to spend more time with other tasks. It assists the user in the analysis and troubleshooting of an issue. It provides a good overview and relationships of all the components of their systems. Platform 100's dynamic dashboard gives an important overview and information on, e.g., the SAP systems. Platform 100's health overview provides all alerts from your SAP, DBMS, OS and infrastructure.

Unified Monitoring

System monitoring is beyond just event notification and platform 100 offers a holistic approach to application performance management that encompasses the components within an IT system landscape. The services provided by platform 100 are highly customizable and increasingly adaptive. With a vibrant R&D team that continuously work on ABAP/JAVA/HANA/ASE monitors, platform 100 can and does monitor OS metrics included by SAP. Additionally, platform 100 provides an efficient agentless way of monitoring operating system resources like the CPU, Memory utilization, Disk utilization, Paging-in and Paging-out, Physical memory, Allocated memory on Linux/UNIX.

With platform 100, you have the option of setting the required threshold values to alert you when there is either a warning or an alarm incident. A visual display of the current OS status, as well as a chronological display of the events that have occurred, can be reported using platform 100. Platform 100 provides you with a data chart depicting a correlation of the individual components of the operating system in such an intuitive form as to enable you to view at a glance the bottlenecks in your system, in relation to dependent applications and database. Platform 100's Linux/UNIX automates the monitoring of critical OS processes by name or name patterns. Platform 100 can monitor printer queues managed by the host lpd facility. Syslog monitor for error messages is supported. Storage utilization by filesystem is readily reported for capacity monitoring.

Platform 100's Linux/UNIX monitoring includes the ability to automate SSH jobs, either on-demand or scheduled, in essence replacing the need for local management of cron jobs. Some examples include the ability to kick off database archive log backups to free FS space, or schedule backups via OS scripts, even taking SAPOSCOL snapshots of system configuration or stats.

CONCLUSION

Platform 100 SaaS platform remotely orchestrates complex IT operations. When applied to the automation of Application Performance Management, enterprise customers have realized savings up to 90% of the time and cost, while gaining a valuable global Remote Trusted Advisor. Platform 100 delivers low-overhead, non-invasive solutions that increase visibility into system performance, improve data gathering, and provide targeted analysis and troubleshooting for SAP systems so that your IT team can become more proactive and responsive which will enable them to have a direct, positive impact on business operations. Platform 100 allows you to run reports automatically on a pre-defined schedule and email them to key team members as well as IT management.

To mitigate the great risk of costly system outages, a proven solution and in current use at enterprises of all sizes, platform 100 is needed to ensure system uptime and optimum system-wide performance. This simplifies the management of large scale SAP landscapes. Platform 100 offers granular level monitoring of the applications in your landscape enabling you to implement highly sophisticated Performance and Service Level Management, complete with true policy-driven automation/remediation, reporting, and integration with the rest of your operational landscape. Platform 100 allows for highly sophisticated interactive charting, drill downs, and contextual presentation while providing high scalability with the use of modest resources. Platform 100 provides an easy-to-use, web-based interface for mining and reporting on the historical SAP performance and availability data.

Figure 11:
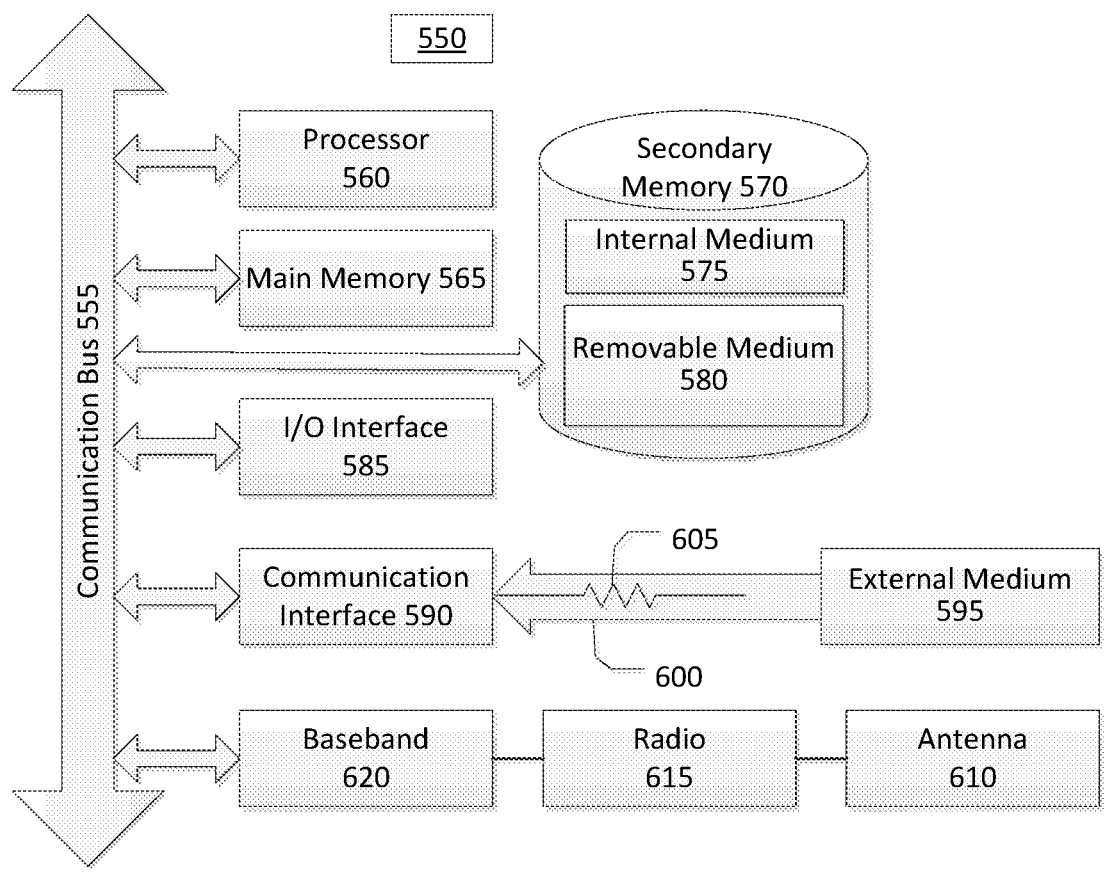
FIG. 11 is a functional block diagram illustrating a system for use with the system of FIG. 2A and FIG. 2B to provide the functions described in connection with FIG. 1 and FIG. 3 through FIG. 10.

FIG. 11 is a functional block diagram illustrating an example wired or wireless system 550 for use with the system of FIG. 2A and FIG. 2B to provide the functions described in connection with FIG. 1 and FIG. 3 through FIG. 10. The system 550 can be used in connection with various embodiments described in connection with the platform 100 100, the object repository 101, the process engines 102, and other aspects of the platform 100 100 described herein. For example the system 550 can be used as or in conjunction with the platform 100 100, object repository 101, and the process engines 102 described above, and may represent components of the platform 100 100, the corresponding backend server(s), load balancers, gateways, adapters 108, and/or other devices described herein. The system 550 can be a server or any conventional personal computer or mobile electronic device (e.g., the mobile device 106), or any other processor-enabled device that is capable of wired or wireless data communication. The platform 100 100 and the system 550 can also take advantage of certain distributed computing methods using one or more distributed processors, such as cloud computing. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, California.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPM), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. The memory 565 and the memory 570 can be implemented to perform the functions of the object repository 101 or other information and data received from the one or more customer systems 110, for example. It should be understood that programs stored in the memory and executed by processor 560 may be written and/or compiled according to any suitable language, including without limitation C/C++, Java, JavaScript, Pearl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605.

The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615 and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Other Aspects

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. In addition, one embodiment is not necessarily mutually exclusive of another embodiment. Embodiments described herein can be freely combined with one another where combinations of features would not render other feature inoperable for their intended purpose. Thus, the particular features, structures, or characteristics may be combined in any suitable manner in one or more embodiments.

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

The invention claimed is:

1. A system for evaluating and managing system performance of one or more customer systems, the system comprising:
   a repository for storing one or more objects;
   a gateway communicatively coupled to a customer system, the customer system separated from a wide area network by a firewall, and including one or more computer systems and databases within a customer premises, the gateway comprising a plurality of process engines and a plurality of adapters configured to translate commands and data with system applications within a customer system without deploying agents within the customer system;
   a plurality of active objects configured to implement a plurality of workflows wherein the plurality of workflows are configured to perform at least following scheduling and determine which accounts manage the queues for the objects to temporarily acquire java threads and execute the request sent to them;
   one or more processors communicatively coupled to a memory and the gateway, the firewall being disposed between the gateway and the one or more processors, the one or more processors and the gateway wherein the gateway being configured to cause a plurality of process engines to load the plurality of active objects in the memory, further being configured to:
   detect an alert that a monitoring policy for the customer system has been violated,
   automatically generate a corrective action workflow, and
   deploy the corrective action workflow through at least one of the plurality of active objects.

2. The system of claim 1, wherein the one or more processors and the gateway being further configured to generate a notification when the alert is detected.

3. The system of claim 1, wherein the alert is related to one of the following: DB archive log backup when the archive filesystem reaches set threshold, restarting a printer queue when a monitored printer status goes offline, and restarting SAP qRFC queues when such queues are stuck or errors occur.

4. The system of claim 1, wherein the repository includes one or more memories.

5. The system of claim 1, wherein the repository provides an object-oriented persistence layer based on relational SQL DB.

6. A system for evaluating and managing system performance of one or more customer systems, the system comprising:
   a repository for storing one or more objects;
      a gateway communicatively coupled to a customer system, the customer system separated from a wide area network by a firewall, and including one or more computer systems and databases within a customer premises,
      the gateway comprising a plurality of process engines and a plurality of adapters configured to translate commands and data with system applications within a customer system without deploying agents within the customer system;
   a plurality of active objects configured to implement a plurality of workflows wherein the plurality of workflows are configured to perform at least following scheduling and determine which accounts manage the queues for the objects to temporarily acquire java threads and execute the request sent to them;
   one or more processors communicatively coupled to a memory and the gateway, the firewall being disposed between the gateway and the one or more processors, the one or more processors and the gateway wherein the gateway being configured to cause a plurality of process engines to load the plurality of active objects in memory, further being configured to:
   receive information related to a desired workflow;
   automatically generate a workflow based on the received information; and
   deploy the workflow through the plurality of adapters and the plurality of active objects.

7. The system of claim 6, wherein the repository includes one or more memories.

8. The system of claim 6, wherein the repository provides an object-oriented persistence layer based on relational SQL DB.

* * * * *